US 9,909,355 B1

United States Patent
Jochum et al.

(10) Patent No.: US 9,909,355 B1
(45) Date of Patent: Mar. 6, 2018

(54) DOOR FOR VEHICLE STEPS

(71) Applicant: Northwest Ag Systems, Boone, IA (US)

(72) Inventors: Stephen J. Jochum, Boone, IA (US); Dane J. Munsch, Boone, IA (US)

(73) Assignee: Northwest Ag Systems, Boone, IA (US)

(*) Notice: Subject to any disclaimer, the term of this patent is extended or adjusted under 35 U.S.C. 154(b) by 0 days.

(21) Appl. No.: 15/463,517

(22) Filed: Mar. 20, 2017

(51) Int. Cl.
*B60R 3/02* (2006.01)
*B60R 9/06* (2006.01)
*E06B 5/10* (2006.01)
*B60R 3/00* (2006.01)
*E05D 3/08* (2006.01)
*E05F 15/70* (2015.01)
*E06C 5/02* (2006.01)
*E06C 5/44* (2006.01)

(52) U.S. Cl.
CPC .............. *E06B 5/10* (2013.01); *B60R 3/00* (2013.01); *E05D 3/08* (2013.01); *E05F 15/70* (2015.01); *E06C 5/02* (2013.01); *E06C 5/44* (2013.01)

(58) Field of Classification Search
CPC .. B60R 3/02; B60R 3/007; B60R 9/06; E06C 7/082; E02F 9/0833; A01D 41/1261
See application file for complete search history.

(56) References Cited

U.S. PATENT DOCUMENTS

| 3,968,857 | A | 7/1976 | Bryan | |
|---|---|---|---|---|
| 4,126,206 | A | 11/1978 | Becnel | |
| 5,343,977 | A | 9/1994 | Bryan | |
| 6,179,312 | B1 * | 1/2001 | Paschke | B60R 3/02 105/444 |
| 6,817,433 | B1 * | 11/2004 | Bergstrom | B62D 33/06 180/89.12 |
| 7,793,759 | B1 | 9/2010 | Aiken, Jr. | |
| 2004/0173406 | A1 | 9/2004 | Lantz | |
| 2016/0129783 | A1 | 5/2016 | Tamura | |
| 2016/0186493 | A1 | 6/2016 | Young | |

* cited by examiner

*Primary Examiner* — Bryan Evans
(74) *Attorney, Agent, or Firm* — McKee, Voorhees & Sease, PLC

(57) ABSTRACT

A cover is provided to protect steps leading to a cab of a vehicle from accumulation of mud, snow, ice and other debris when the vehicle is driven. The cover is pivotally mounted for movement between an open position allowing a vehicle operator to climb the steps and a closed position covering the steps from top to bottom to maintain cleanliness of the steps as the vehicle is driven. The cover can be opened and closed from the top of the steps, either manually or with an actuator. The cover is normally closed when the vehicle is moving and open when the vehicle is stationary.

17 Claims, 8 Drawing Sheets

DOOR FOR VEHICLE STEPS

FIELD OF THE INVENTION

The present invention relates to method and means for protecting steps on a vehicle from a buildup of mud or other debris when the vehicle is driven across the ground or other conditions where buildup may form on the steps.

BACKGROUND OF THE INVENTION

Vehicles such as tractors, and other earth moving or earth working vehicles, typically have a cab or operator's station with steps which an operator climbs to get in and out of the cab. When the vehicle is driven through fields or along the ground, mud, dirt, and other debris can collect on the steps, which presents a hazard to the operator when using the steps.

For example, drag line manure application in an agricultural field is an operation wherein liquid manure is pumped from a storage tank through hose lines pulled by the tractor, and then injected into the ground with a plow as the "plow tractor" traverses the field. This operation creates mud. The "humper" tractor drives through the mud to assist the "plow tractor" by pulling the drag line through the field. As the tractor is driven through the field, the mud tends to build up on the tractor steps, which creates a slippery and dangerous exit for the operator climbing down from the work vehicle. Similar mud accumulation on the vehicle steps occurs in other operations, such as farming and earth working vehicles working in wet conditions, over the road trucks or vehicles driving in icy or snowy conditions, construction vehicles working in muddy or snowy environments, and the like.

Therefore, there is a need to eliminate such hazardous accumulation of mud, snow, ice, or debris on steps of a vehicle having an operator station which requires the operator to climb the steps to get in and out of the operator station.

Accordingly, a primary objective of the present invention is the provision of a step protector or cover which can be opened and closed relative to the steps to prevent buildup of material on the steps when the vehicle is driven.

Another objective of the present invention is a provision of a method for maintaining cleanliness of exterior steps leading to and from a cab operator station of a vehicle while the vehicle is driven in the fields, over the ground or along a road or other surface.

A further objective of the present invention is the provision of a cover for vehicle steps which can be opened and closed by an operator at the top of the steps.

Still another objective of the present invention is the provision of a step cover for vehicle steps which can be opened and closed from the top and the bottom of the steps.

Still another objective of the present invention is a provision of a step protector for a vehicle having a raised operator station with steps leading to the station, wherein the cover can be opened and closed by an operator in the station.

Another objective of the present invention is the provision of a method and means for automatically opening and closing a cover on vehicle steps using a switch in the operator station of the vehicle.

Another objective of the present invention is a provision of a step protector which covers the front and the back of steps on a vehicle which is driven in wet, muddy, snowy, or icy conditions.

A further objective of the present invention is the provision of a method and means for an operator in a vehicle operation station to remotely open and close a cover on steps leading to and from the station.

A further objective of the present invention is a provision of a step protector for a vehicle having a raised operation station which is economical to manufacture, easy to install, and durable and safe in use.

These and other objectives have become apparent from the following description of the invention.

SUMMARY OF THE INVENTION

A step protector is provided for the steps of a vehicle having a raised operator's cab or station at the top of the steps. The protector includes a cover pivotally mounted to the vehicle for movement between an open position allowing the operator to climb the steps and a closed position covering the steps from top to bottom to prevent debris from accumulating on the steps while the vehicle is driven. The cover can be opened and closed from the top and from the bottom of the steps. The operator can open and close the cover manually or through an actuator connected to the cover. The actuator can be electrically coupled to a switch connected to the station door, seat, or transmission of the vehicle, to automatically operate the actuator to open and close the cover only when the vehicle is stationary.

DETAILED DESCRIPTION OF THE INVENTION

Figure 1:
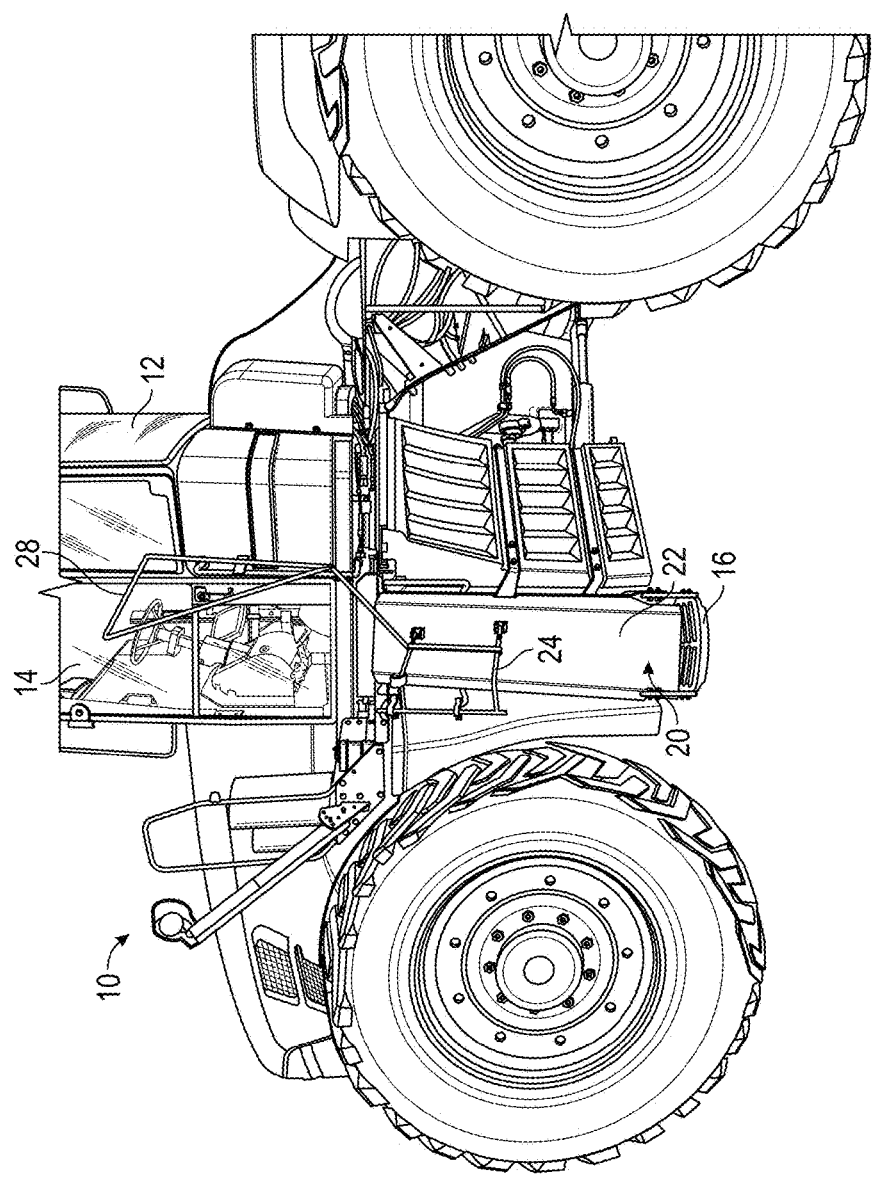
FIG. 1 is a view showing a first embodiment of a manually operated step protector according to the present invention, mounted on tractor steps and shown in the closed position.
Figure 2:
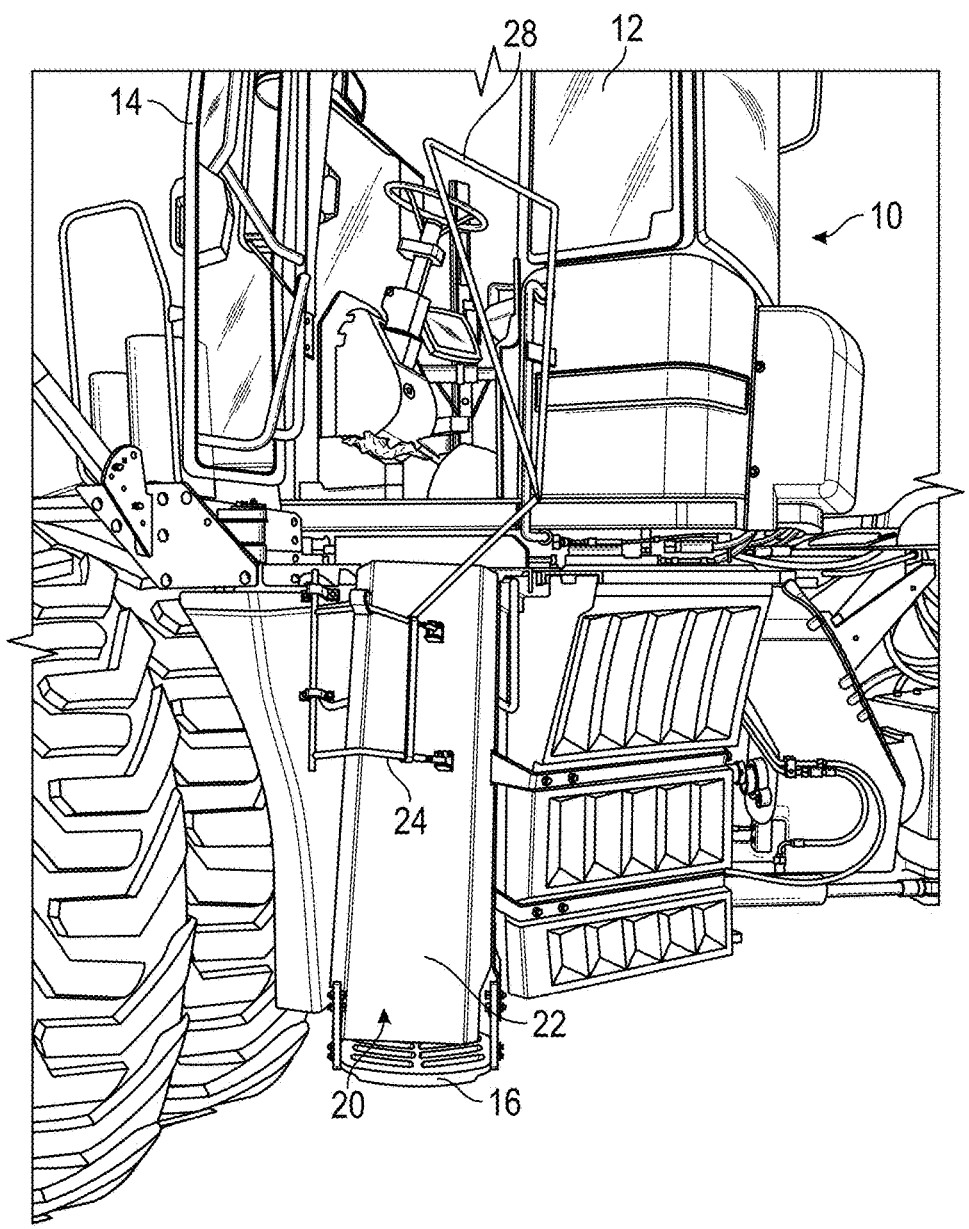
FIG. 2 is another view of the step protector shown in FIG. 1, in a closed position.
Figure 3:
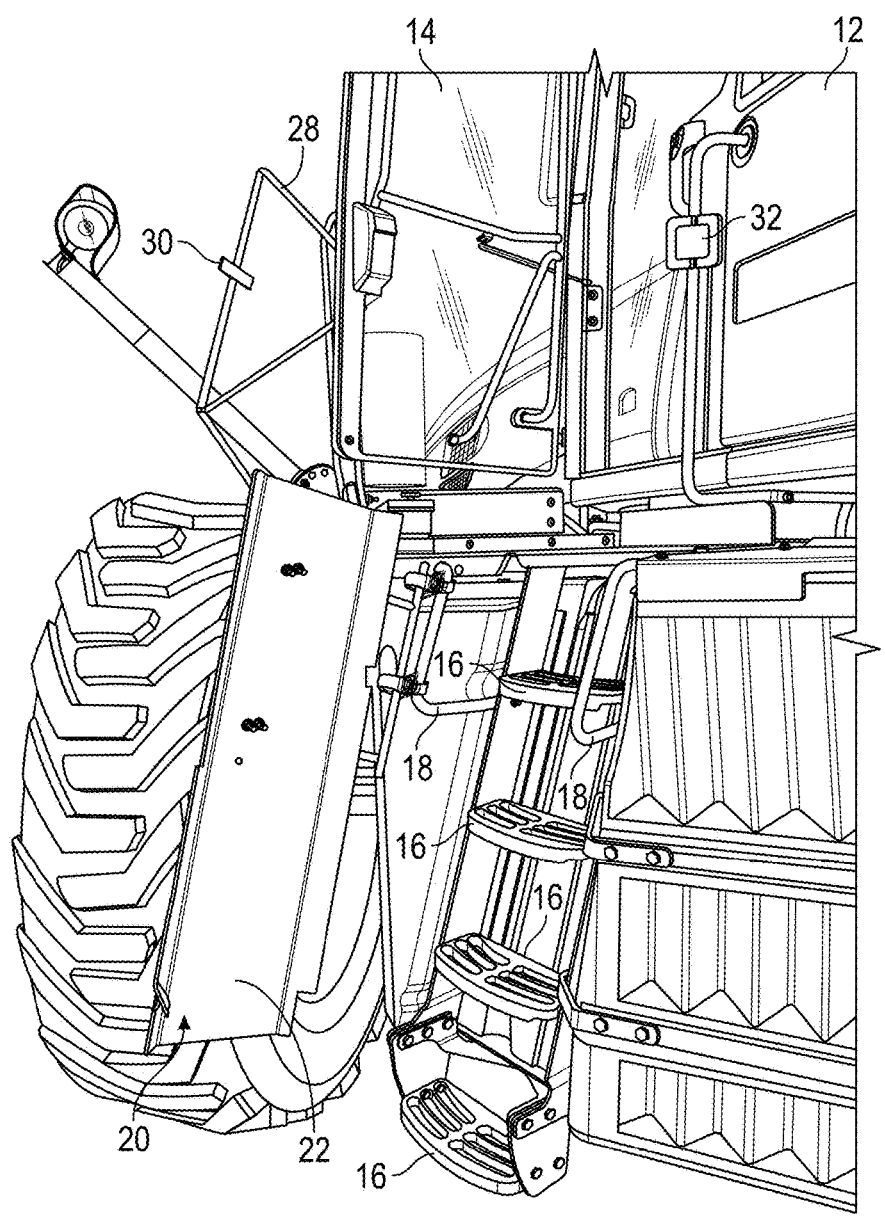
FIG. 3 is a view of the step protector shown in FIG. 1 in an open position.
Figure 4:
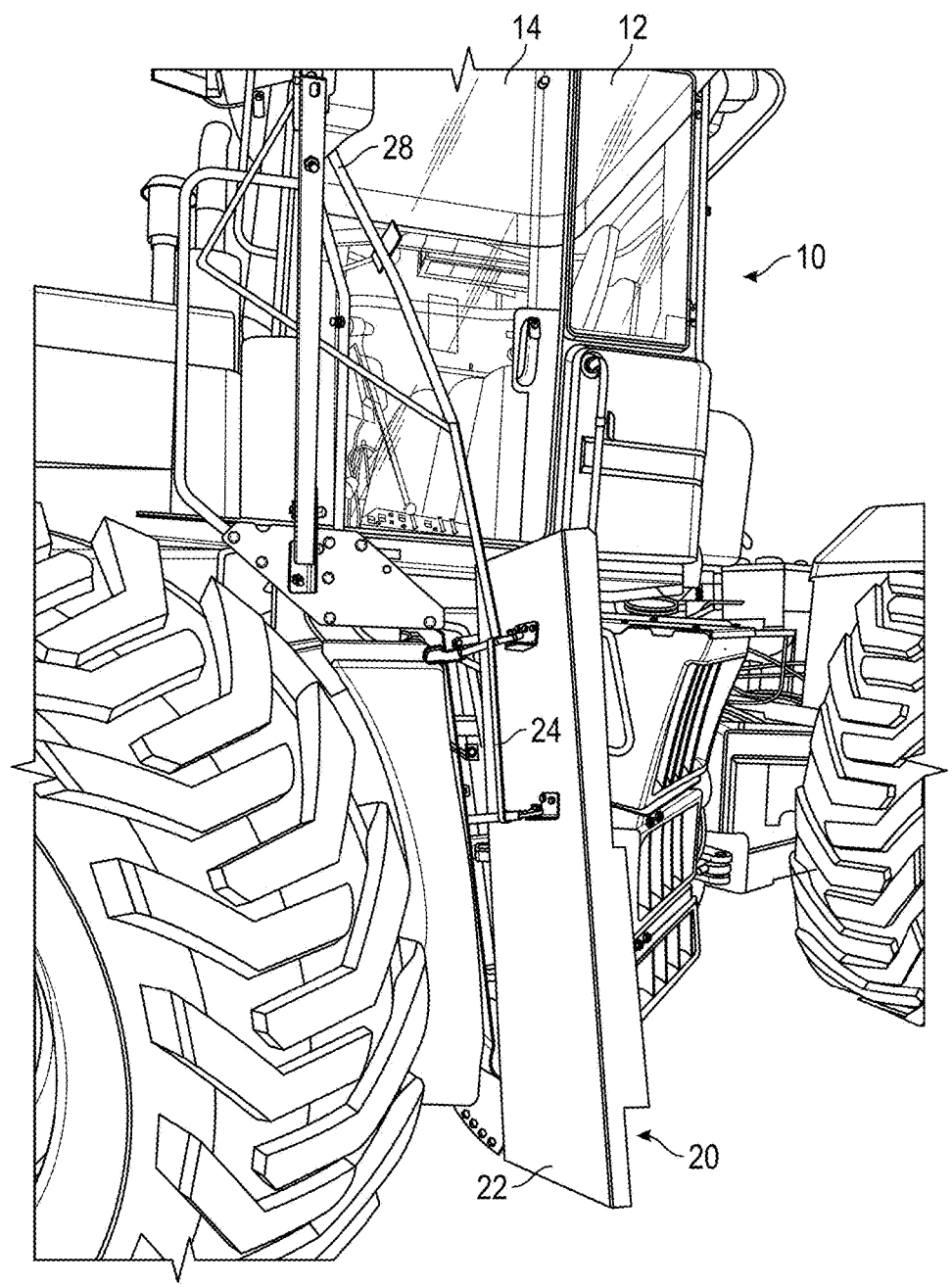
FIG. 4 is another view of the step protector shown in FIG. 1 in an open position.
Figure 5:
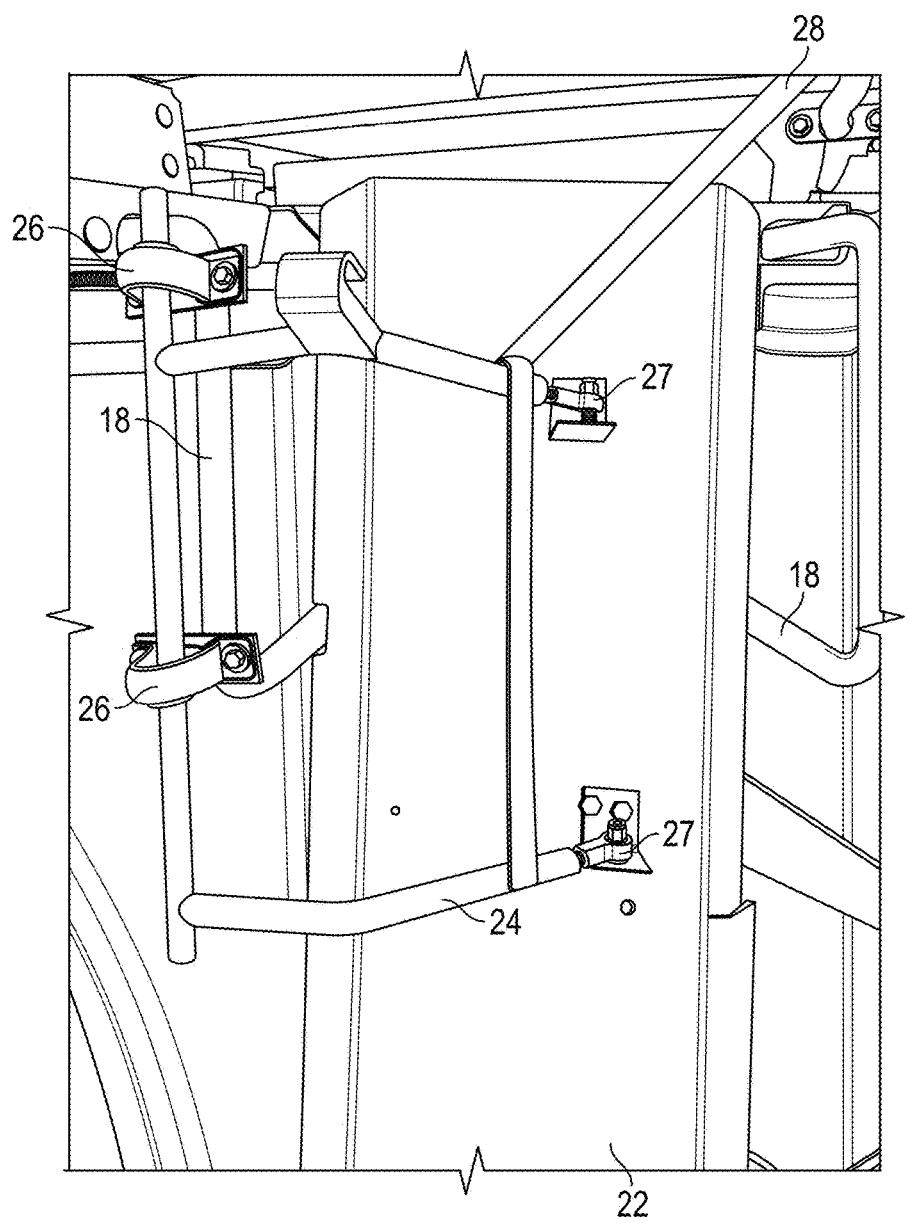
FIG. 5 is a close-up view of the bracket assembly for the manually operable step protector shown in FIG. 1.

The present invention is intended for use with various types of vehicles which travel over the ground, the road, or other environments which encounter mud, snow, ice, and other debris. For purposes of illustration, the drawings show one such vehicle, an agricultural tractor 10. The tractor 10 includes a raised or elevated cab 12 with a seat for the operator to drive the tractor. The cab includes a door 14. A plurality of steps 16 allow an operator to climb up to and down from the cab 12. A handrail 18 is provided on one or both sides of the steps 16 for safety of the operator when climbing the steps 16.

The present invention is directed towards a step protector 20 which is mounted to the vehicle 10 so as to cover the steps 16 from top to bottom. The protector 20 includes a front cover 22 which is pivotally mounted to the vehicle or to the steps 16 so as to be movable between open and closed positions relative to the steps 16. Movement of the cover 22 can be accomplished manually or by an actuator from the top of the steps after the operator is at the top of the steps 16 or in the cab 12, before the vehicle is driven. Optionally, the cover 22 can be closed from the bottom of the steps 16 while the vehicle is stationary.

FIGS. 1-5 show the manual embodiment of the step protector 20. The cover 22 extends the full width and height of the steps 16. A bracket assembly 24 pivotally mounts the cover 22 to the tractor or vehicle 10. More particularly, the bracket assembly 22 includes a pair of shaft collars 26 which mount on the handrail 18 of the steps 16. The shaft collars 26 include bearings to allow the cover 22 to move between the open and closed positions. The bracket assembly 24 includes ball joint rod ends 27 connected to the cover 22 to allow the cover to swivel into close engagement with the steps 16 when the cover 22 is closed. The shaft collars 26 and rod ends 27 create a double hinge to assure proper closing of the cover 22 over the steps 16.

A handle 28 extends upwardly from the cover 22 or the bracket assembly 24. The handle 28 serves two functions: (1) the handle 28 allows an operator to open and close the cover 22 from a position at the top of the steps 16; and (2) the handle 28 provides a safety mechanism when the cover is closed to prevent the operator from stepping down without first opening the cover 22. The cover handle 28 also includes a plate 30 which magnetically engages with a plate 32 on a cab handrail 34. At least one of the plates 30, 32 is magnetic, so as to retain the handle 28 and the cover 22 in a closed position when the tractor or vehicle 10 is traveling over the ground. As an alternative to the magnetic plate 30/32, a latch or other securement mechanism can be employed to keep the cover 22 closed when the vehicle 10 is moving.

Figure 6:
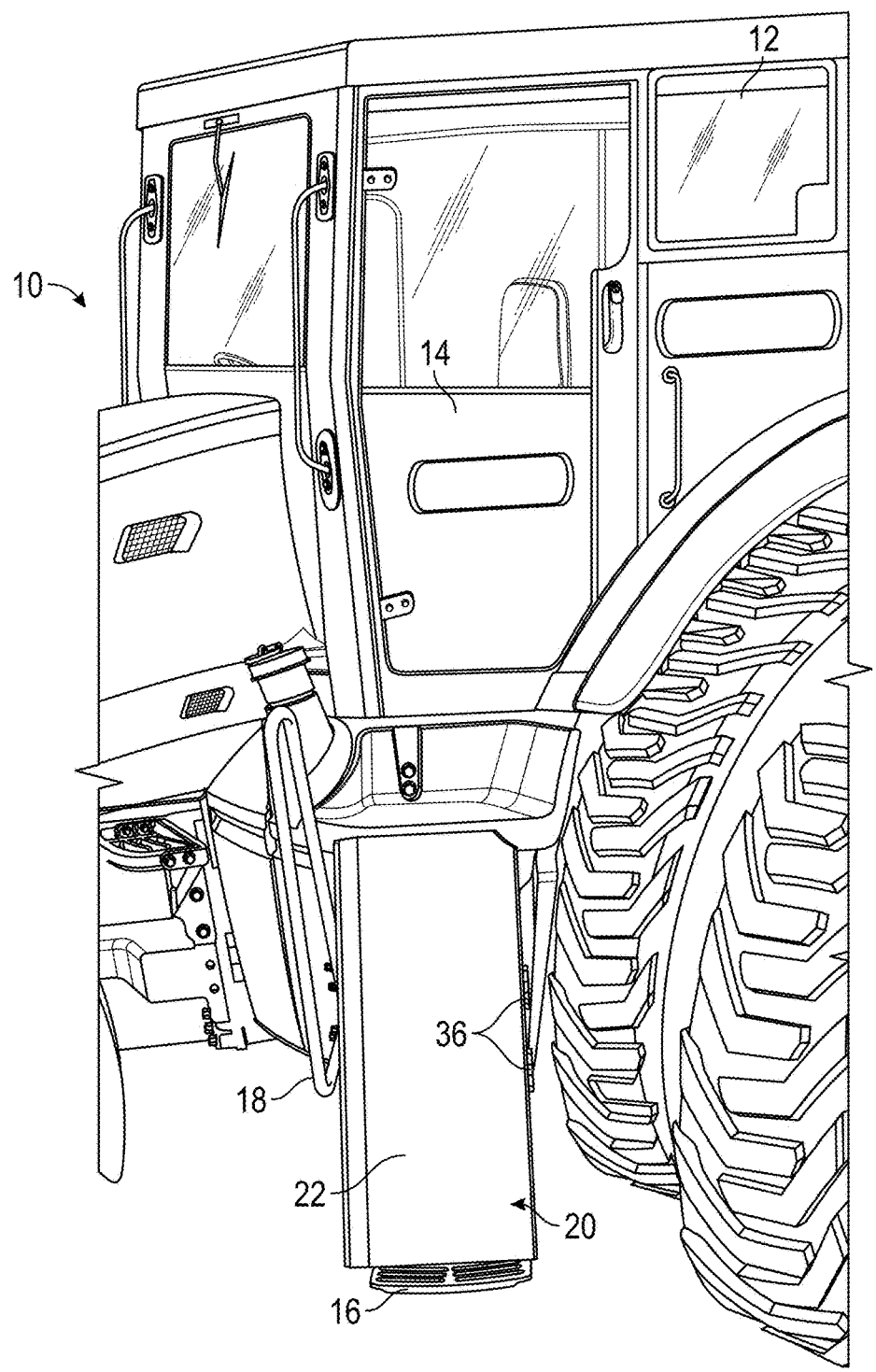
FIG. 6 is a view showing a second embodiment of the step protector which is opened and closed using an actuator, and closed in a closed position.
Figure 7:
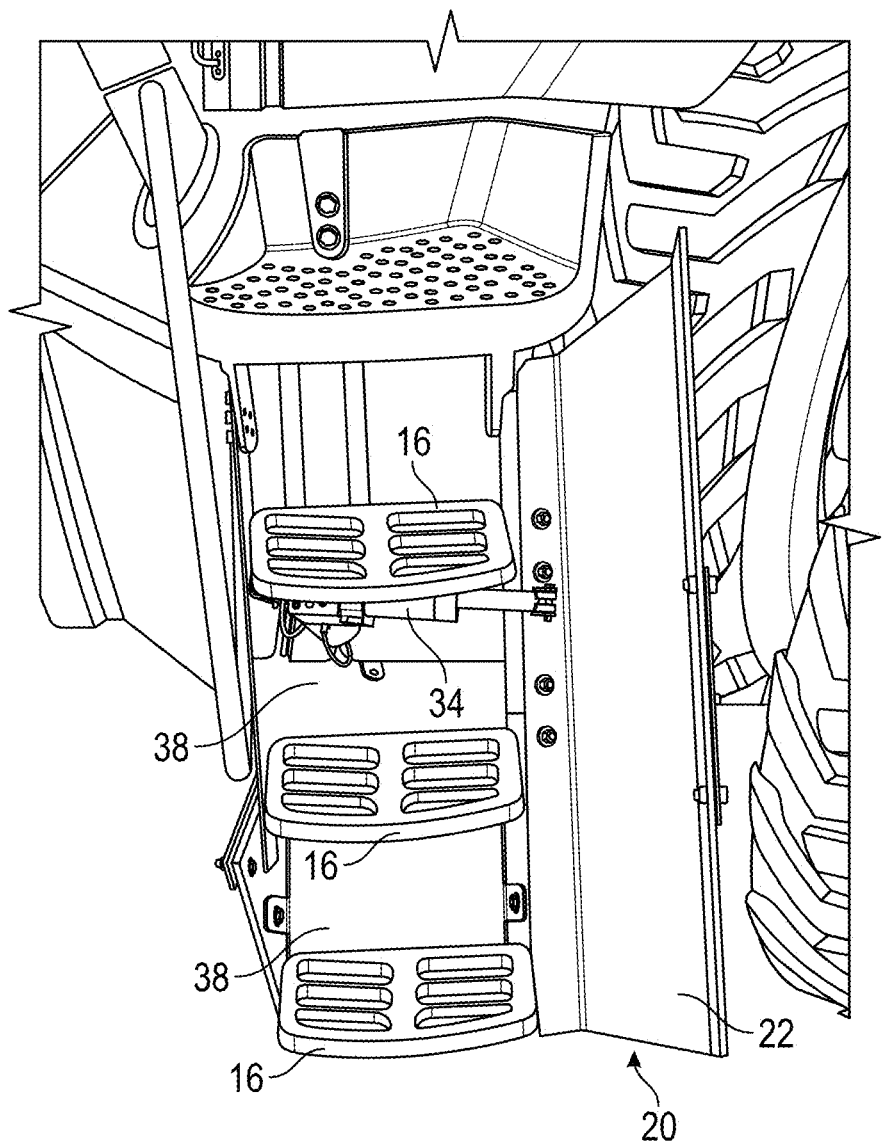
FIG. 7 is a view of the step protector of FIG. 6 shown in an open position.
Figure 8:
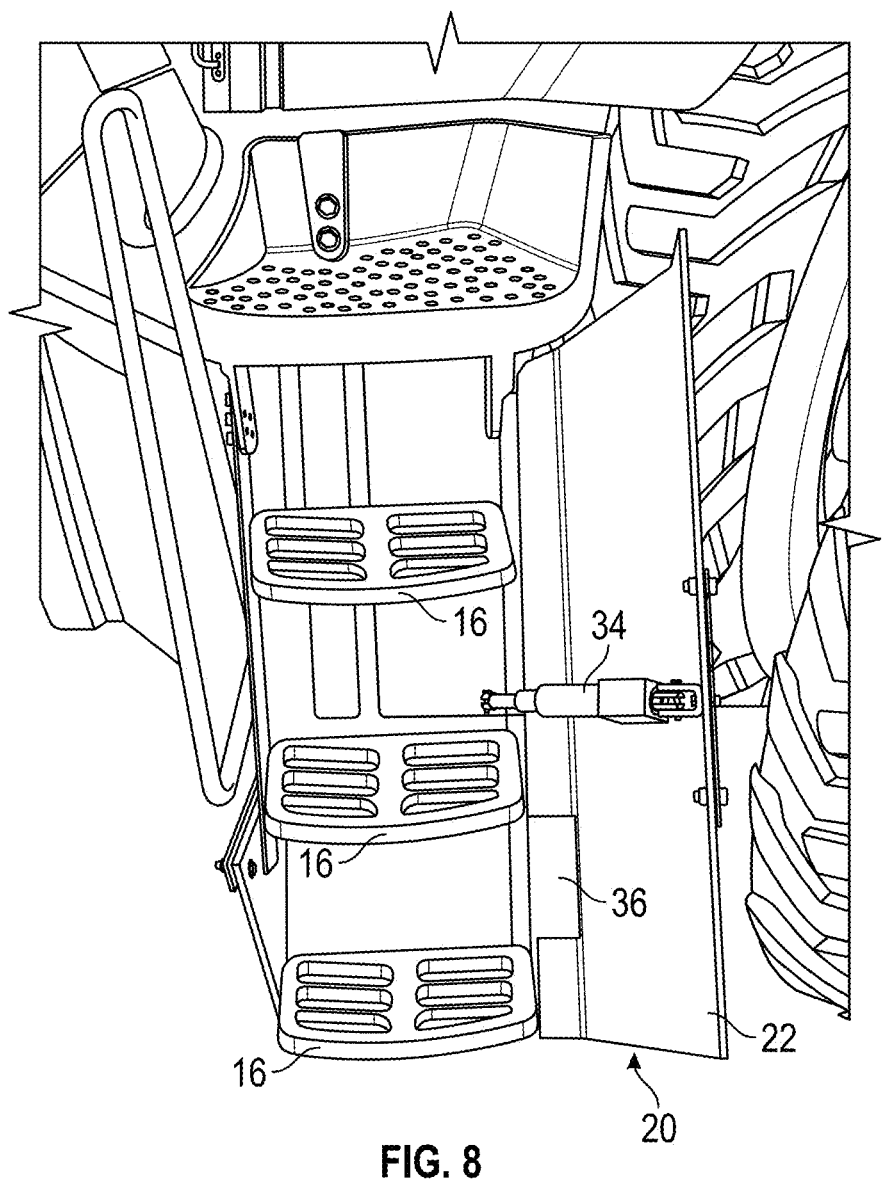
FIG. 8 is a view similar to FIG. 7 showing the actuator mounted in a different position on the cover and steps.

A second embodiment of the present invention is shown in FIGS. 6-8. In this alternative embodiment, the cover 22 is open and closed by an actuator 34, such as a linear actuator with a reversible electric motor, or a hydraulic cylinder, or a pneumatic cylinder. In this second embodiment, the cover 22 is pivotally mounted to the steps 16 by one or more hinges 36. The actuator 34 has one end connected to the steps 16 or to other structure on the tractor 10, and the outer end connected to the cover 22. As shown in FIG. 7, the actuator 34 is connected to the cover 22 on the inside edge near the hinges 36, and extends beneath one of the steps 16. In an alternative configuration shown in FIG. 8, the actuator 34 is connected to the cover 22 adjacent the outside edge opposite from the hinge 36.

The actuator 34 may be controlled by a switch. For example, the switch may be a toggle switch mounted in the cab 12 for control by the vehicle operator in opening and closing the cover 22. Alternatively, the switch may be mounted on the cab door 14, such that the cab door and the cover 22 open and close in unison, or sequentially. As another alternative, the switch can be mounted on the seat so as to close the cover 22 when the operator sits down and open the cover 22 when the operator gets out of the seat. A further option is to provide a switch which is tied to the transmission of the vehicle 10, such that when the vehicle is shifted into drive, the cover will be closed, and when the vehicle is shifted into park, the cover 22 will open.

It is understood that the cover 22 may be made from various materials, including steel, aluminum, plastic or wood. Also, the cover 22 can be mounted on the tractor or vehicle 10 in any convenient manner, other than using the bracket assembly 24 or the hinge 36 shown in the drawings.

As another alternative, the step protector 20 of the present invention may include a back cover or plate 38 fixed to the steps 16 to prevent mud, snow, ice or debris from collecting on the steps from the rear. This rear plate does not need to pivot, since the rear plate does not block an operator from climbing the steps.

Thus, the step protector 20 of the present invention provides a method for maintaining cleanliness of the steps which lead to the cab of the vehicle. The method involves pivotally mounting the cover 22 to the vehicle or to the vehicle steps 16 so as to be movable between open and closed positions relative to the steps 16, opening the cover either manually or via the actuator 34 to allow the operator to climb up the steps 16 and into the cab, closing the cover 22 from a position above the steps 16 after the operator climbs up the steps and before the vehicle moves, and then after the vehicle comes to a stop, opening the cover from a position above the steps either manually or via the actuator 34. Automatic cover opening and closing with the actuator 34 can be coordinated with the opening and closing of the cab door 14, or with the operator's position on the seat in the cab, or with the drive and park status of the vehicle transmission. The opening and closing of the cover 22 can also be accomplished via a toggle switch in the cab, or by a remote controller held in the operator's hand.

The step cover 20 can be used in various applications and environments. Some examples include liquid manure injection, dry manure spreaders, rice farming, pea combines, payloaders, silage collection and chopping, construction vehicles, mining vehicles, semi-trucks, cattle feeders, and others.

The invention has been shown and described above with the preferred embodiments, and it is understood that many modifications, substitutions, and additions may be made which are within the intended spirit and scope of the invention.

From the foregoing, it can be seen that the present invention accomplishes at least all of its stated objectives.

What is claimed is:

1. A step protector for an agricultural tractor having a cab and steps adjacent the cab for an operator to climb up to and down from the cab, the protector comprising;
    a cover pivotally mounted to the vehicle for movement between an open position allowing the operator to climb the steps and a closed position covering the steps from top to bottom so as to prevent debris from accumulating on the steps while the vehicle is driven
    an actuator to move the cover between the open and closed positions, wherein the actuator extends behind the steps.

2. The step protector of claim 1 further comprising a handle extending from an upper portion of the cover to allow the operator to move the cover between the open and closed position while at the top of the steps.

3. The step protector of claim 1 wherein the cover includes a bracket assembly to mount the cover to the vehicle.

4. The step protector of claim 3 wherein the bracket assembly includes upper and lower brackets connecting the cover to the vehicle.

5. The step protector of claim 3 wherein the bracket assembly includes a double hinge.

6. The step protector of claim 5 wherein the double hinge includes a shaft collar and a rod with a ball-joint end.

7. The step protector of claim 1 further comprising a plate fixed to a back portion of the steps from top to bottom.

8. A method for maintaining cleanliness of exterior steps leading to and from a cab of an earth working vehicle while the vehicle is driven, the method comprising:

pivotally mounting a cover to the vehicle so as to be movable between open and closed positions relative to the steps, wherein an actuator extends behind the steps to move the cover between the open and closed positions;

opening the cover to climb up the steps;

closing the cover from a position above the steps after climbing up the steps and to cover all steps before the vehicle moves;

opening the cover from a position above the steps after the vehicle comes to a stop.

9. The method of claim 8 wherein the cover is opened and closed manually.

10. The method of claim 8 wherein the cover is opened and closed automatically.

11. The method of claim 10 wherein the automatic opening and closing of the cover is coordinated with opening and closing of a door on the cab.

12. The method of claim 10 wherein the cover automatically closes when an operator sits into a seat in the cab and automatically opens when the operator gets out of the seat.

13. The method of claim 10 wherein the cover automatically closes when the vehicle transmission is shifted from park to drive and automatically opens when the vehicle transmission is shifted from drive to park.

14. The method of claim 8 wherein the cover is opened and closed electronically.

15. The method of claim 14 wherein opening and closing the cover is activated by a switch.

16. The method of claim 8 wherein opening and closing the cover is done from a remote position spaced from the cover.

17. The method of claim 8 wherein the actuator is a linear actuator.

* * * * *